United States Patent [19]
Hill

[11] 3,984,712
[45] Oct. 5, 1976

[54] END TURN SHIELD AND WINDING CONNECTOR

[75] Inventor: Donald E. Hill, Fort Wayne, Ind.

[73] Assignee: Industra Products, Inc., Fort Wayne, Ind.

[22] Filed: Nov. 11, 1974

[21] Appl. No.: 522,440

[52] U.S. Cl. .............................................. 310/71
[51] Int. Cl.² .................................... H02K 11/00
[58] Field of Search .................. 310/71, 43, 45, 89, 310/91, 215, 260, 66, 85, 194, 214; 29/628; 339/221, 276, 276 T; 336/107, 192

[56] References Cited
UNITED STATES PATENTS

| | | | |
|---|---|---|---|
| 2,583,804 | 1/1924 | Andrus | 310/71 |
| 2,653,257 | 9/1953 | Sailer | 310/71 UX |
| 3,002,119 | 9/1961 | Lindstrom | 310/260 |
| 3,457,442 | 7/1969 | Charlton | 310/71 |
| 3,760,339 | 9/1973 | Marshall | 29/628 |
| 3,772,544 | 11/1973 | Wrobel | 310/71 |

FOREIGN PATENTS OR APPLICATIONS

| | | | |
|---|---|---|---|
| 524,733 | 11/1929 | Germany | 310/71 |
| 957,752 | 11/1961 | United Kingdom | 310/71 |

*Primary Examiner*—R. Skudy
*Attorney, Agent, or Firm*—Albert L. Jeffers; Roger M. Rickert

[57] ABSTRACT

Method and apparatus for simplifying the process of connecting external lead wires to windings in a dynamoelectric machine is disclosed wherein there is provided a plurality of pairs of intermeshable electric connectors and at least one annular insulating member having one connector of each pair affixed thereto and external lead wires connected to certain ones of the affixed connectors with the other connector of each pair being connected to selected winding leads. The other connector of each pair may also be affixed to another annular insulating member so that, when the two annular members are in a juxtaposed position, respective pairs are aligned, and additional conductors may be provided on either insulating member for interconnecting windings as desired. The annular members may also function to surround the winding end turns at one end of the machine stator to confine and protect those end turns.

6 Claims, 7 Drawing Figures

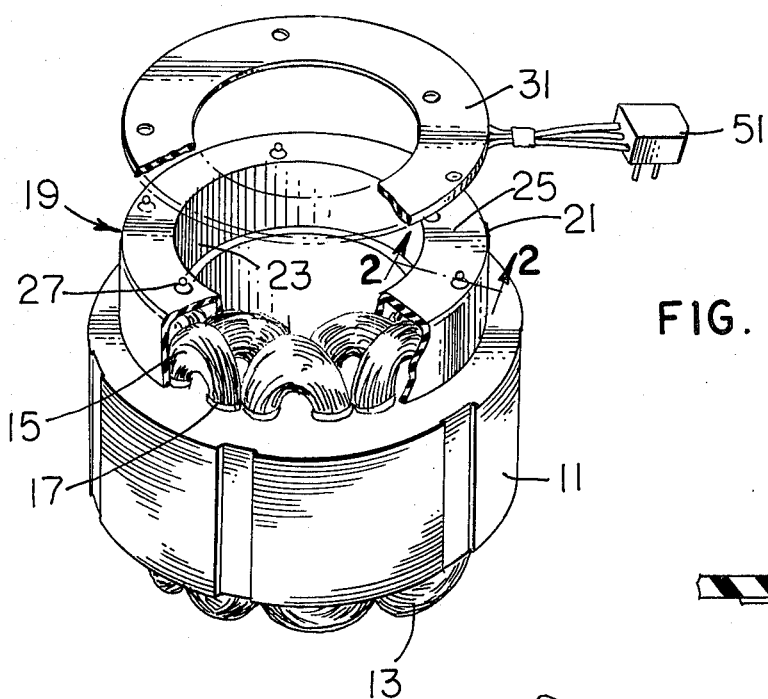
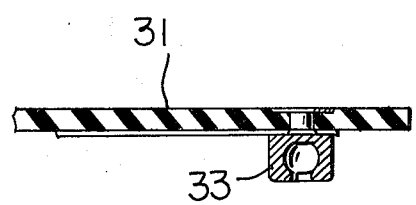
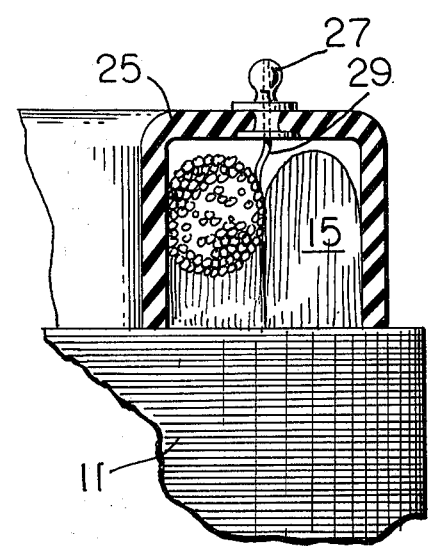
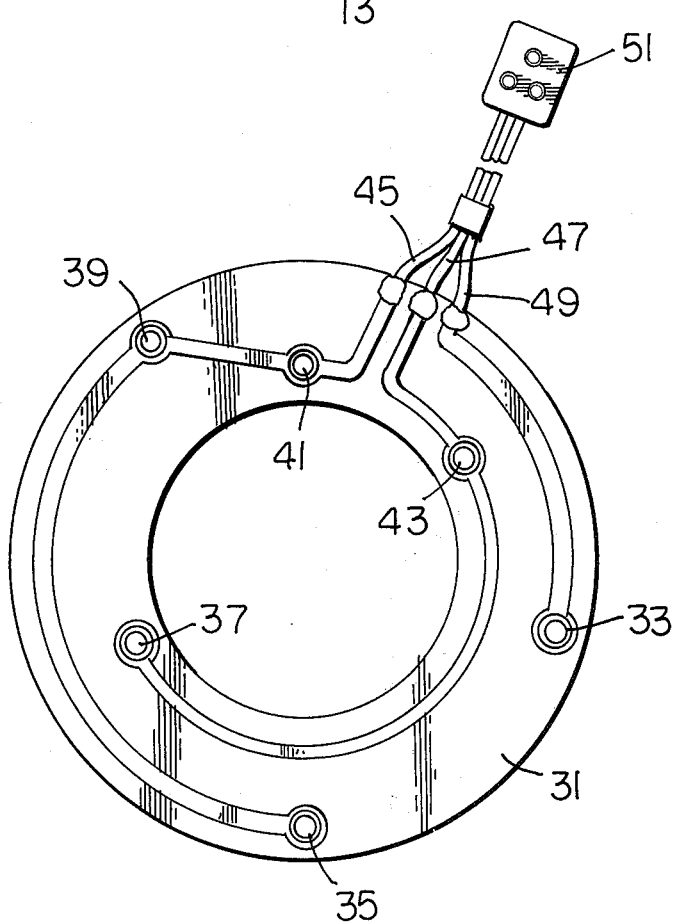

3,984,712

END TURN SHIELD AND WINDING CONNECTOR

BACKGROUND OF THE INVENTION

During the past several years the fabrication of the stators for dynamoelectric machines has progressed from a laborious hand operation to a rapid and efficient primarily automated process, however, the interconnection of stator windings and the connecting of those stator windings to external lead wires are still performed primarily by hand in the manner illustrated in U.S. Pat. Nos. 2,169,097 and 3,219,857. Briefly the winding leads or a winding lead and an external lead wire are twisted together and brazed or soldered and provided with an insulating sleeve to prevent shorting. This is a time consuming and costly hand operation.

Recent recognition of this problem is exemplified by U.S. Pat. Nos. 3,725,707 and 3,760,339 wherein one or more connectors are insulatingly mounted on a stator core in such a manner that the windings may be subsequently inserted and the leads attached to the connectors by twisting or crimping.

It is accordingly one object of the present invention to simplify and speed up the fabrication of dynamoelectric machine stators.

Another object of the present invention is to further reduce the number of hand operations in the manufacture of dynamoelectric machine stators.

A further object of the present invention is to lower the production costs of dynamoelectric machines.

Still another object of the present invention is to support and insulate terminations in an electric motor.

SUMMARY OF THE INVENTION

The foregoing as well as numerous other objects and advantages of the present invention are achieved by providing pairs of intermeshable electrical connectors to attach external lead wires to dynamoelectric machine stator windings disposed in slots in the stator and extending therefrom to form end turns at opposite ends of the stator, connecting a first of each connector pair to a winding lead, and providing an annular insulating member having the second of each connector pair supported thereon with the external lead wires connected thereto so that the annular member may be placed adjacent the end turns and the connector pairs intermeshed. More than one annular insulating member may be provided each supporting interconnectable pairs of connectors and the annular insulating members may also supplant or supplement the normal end turn lacing procedures to hold the individual end turn wires together and confine and protect the end turns. One of the annular insulating members may be provided with conductors to interconnect certain of the winding leads and different annular members may be employed to provide differing modes of operation for the same stator. Thus for example, different insulating members might provide for a series or parallel hook-up of main windings in an electric motor thereby allowing for example, 115 or 230 volt operation, depending on the insulating member's conductive paths. While applicable to all dynamoelectric machine stators, the invention is particularly advantageous in hermetic motors.

The subject matter which I regard as my invention is particularly pointed out and distinctly claimed in the concluding portion of the specification. My invention itself however, together with further objects and advantages thereof may best be understood by reference to the following description taken in conjunction with the accompanying drawing.

BRIEF DESCRIPTION OF THE DRAWING

FIG. 1 is a perspective view of the stator of a dynamoelectric machine embodying the present invention;

FIG. 2 is an enlarged cross sectional view of a portion of the stator of FIG. 1 along the line 2—2 including the intermeshable connector pair;

FIG. 3 is an end view of an annular insulating member and external lead wires coupled to an external connector;

DESCRIPTION OF THE PREFERRED EMBODIMENT

Figure 4:
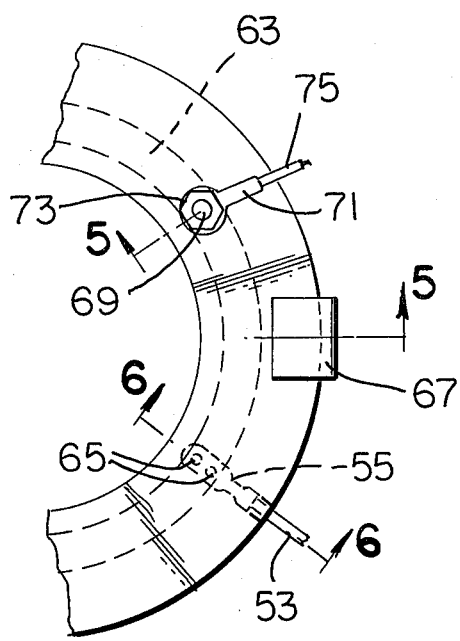
FIG. 4 is a partial end view of a pair of annular rings illustrating a variation on the method of attaching the winding leads to the external lead wires.

In FIG. 1 a dynamoelectric machine stator core 11, has windings disposed in the slots thereof and extending therefrom to form end turns 13 and 15 at opposite ends of the stator along with slot lining insulators 17, according to known techniques. In the prior art it is frequently desirable to perform a lacing function on the end turns to hold those turns together in a compact mass, however, in FIG. 1 the end turns are confined and protected by the annular member 19. The annular member or ring 19 has axially extending and radially separated rims 21, and 23 which extend about the outer and inner peripheries of the end turns and which are connected by a flat annular portion 25, to resiliently grip the end turns. The flat annular portion 25, as more clearly seen in FIG. 2, supports a number of connectors such as 27, which may be crimped to the flat annular portion 25. When the annular member 19 is first placed adjacent to the end turns at one end of the stator winding, leads such as 29 are passed into the connector 27 and the connector crimped to hold the passed winding lead therein. The excess winding lead extending through connector 27, if any, may be trimmed off at this time. A second annular member 31 having corresponding connectors 33, may then be placed adjacent to the stator end and the connector pairs such as 27, and 33 intermeshed to complete the connecting of the external lead wires to the winding leads. Both insulating members are of course, annular to allow a portion of the machine rotor to pass therethrough and, as a spin-off benefit, the inside diameter of either ring functions as a guide and winding guard during rotor insertion. Preferably connector 27 does not extend below ring 25 and connector 33 does not extend above ring 31.

The annular insulating member 31 as seen in FIG. 3 has a plurality of connectors 35, 37, 39, 41 and 43 similar to the connector 33 each of which would of course intermesh with a connector like 27. In FIG. 3 the external lead wires 45, 47 and 49 run between a plug, socket or other external connector 51, and individual ones of the connectors on the annular board 31.

As illustrated in FIG. 3 there are more winding leads than external lead wires and certain of the connectors are interconnected by either jumper wires on the annular member or by fabricating the annular member according to well known printed circuit techniques to interconnect the appropriate winding leads and external wires. The interconnecting portions 40 associated with one or both rings 25 and 31 could also be formed as stampings and subsequently coated with or imbedded in an insulating medium.

Figure 5:
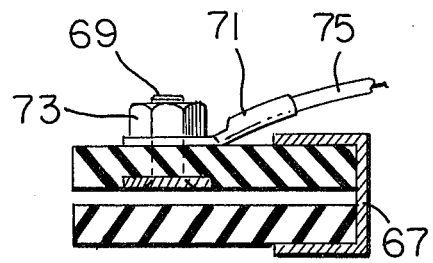
FIG. 5 is a cross sectional view along the line 5—5 of FIG. 4.
Figure 6:
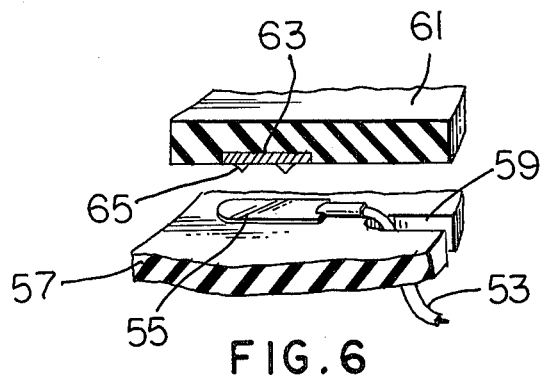
FIG. 6 is an expanded cross sectional view along the line 6—6 of FIG. 4.

In FIGS. 4 through 6 a portion of a pair of annular rings is shown illustrating several possible variations on the present invention which may be suitably interchanged with other variations illustrated in the other drawings. A winding lead 53 has crimped thereto near one end thereof an electrical connector 55. In a typical situation winding leads such as 53, extend upwardly and outwardly from the end turns and as illustrated this lead with its crimped connector 55 may be folded inwardly toward the stator axis and over the annular member 57 by way of slots such as 59, in the annular member 57. When the several winding leads are in position another annular member 61 having conductors 63 and protrusions 65 may be placed thereover in the position illustrated in FIG. 6 and the two annular members forced together as illustrated in FIG. 5 for example by a plurality of C-shaped clips 67, so as to grip the several connectors 55 and make good electrical contact between connectors and the several conductors such as 63 due to the teeth or protrusions 65 engaging the connector 55. Any of the aforementioned approaches for coupling external lead wires to the several conductors such as 63, may be employed, however, as illustrated in FIG. 5, a simple upwardly extending threaded stud 69 receives a lug 71 and a nut 73 for holding the external lead wire 75 firmly in position. Appropriate insulation may be provided over the lug arrangement if desired.

Figure 7:
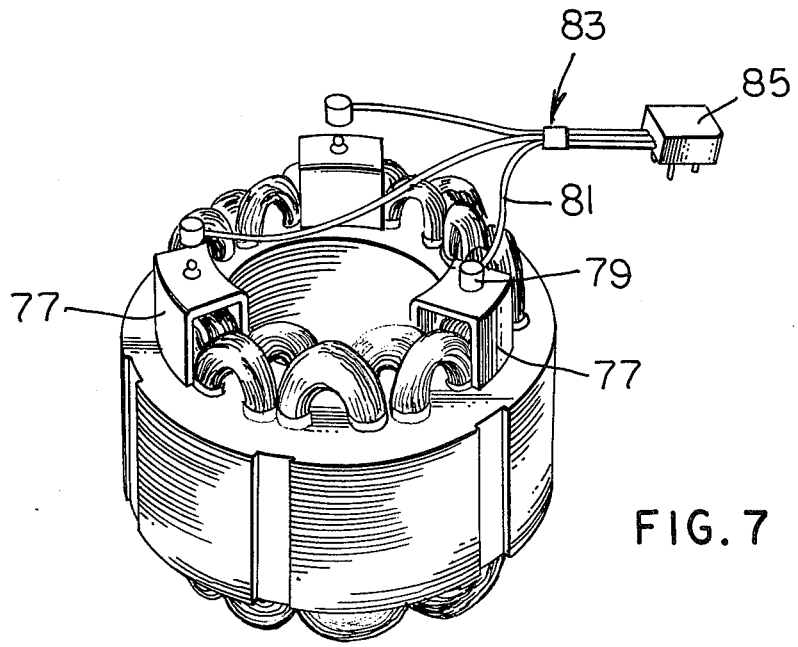
FIG. 7 is a perspective view of a further variation on the present invention.

In FIG. 7, further variations on the present invention are illustrated where only certain saddle like portions of one of the annular member have been retained insulatingly supporting individual members of connector pairs near the end turns of the stator. Thus saddle like portion 77 is clipped over a portion of the annular end turns near an individual one of the winding leads and, of course, that winding lead is passed through one member of the connector pair 79 in much the same manner as the embodiment illustrated in FIG. 2 and the member of the connector pair crimped to the winding lead. In FIG. 7, however, the external lead wires such as 81 are portions of a wire harness 83 having a common external connector 85 at one thereof and connectors of each pair connected to respective lead wires at the ends thereof remote from the external connector. As illustrated in FIG. 7 the several saddle like insulating portions might be placed over in the turns one at a time and the several connector pairs connected together one at a time at the option of the assembler.

In view of the foregoing discussion several variations not necessarily possessing all of the desirable attributes of the preferred embodiment should now be easily comprehended. While end turn lacing may be eliminated by the preferred embodiment, in some instances it may be desirable to either retain the lacing or eliminate the lacing and/or not confine a radially inner or outer slide portion of the end turns or both side portions and merely employ one or two flat annular insulating members. Interconnection of winding leads may be accomplished on either annular member 19, or annular member 25 and either may supply the inner or outer circumferential side support and protection for the end turns. While not typically encountered, both sets of end turns might have winding leads and if leads are present at only one end of the stator, the end turns opposite that end might be protected by a "dummy" annular member. A thermal overload protecting device might be mounted on the underside of the ring in good thermal contact with the end turns and in some cases the outer ring could be affixed to the motor end bell or housing. These and numerous other modifications will readily suggest themselves to those of ordinary skill in the art and accordingly the scope of the present invention is to be measured only by that of the appended claims.

I claim:

1. In a dynamoelectric machine stator having windings disposed in slots of the stator core and extending therefrom at opposite stator ends to form end turns, a winding connector for attaching external lead wires to the leads of the windings comprising:
   a plurality of pairs of intermeshable electrical connectors;
   an annular insulating member having one connector of each pair affixed thereto and external lead wires connected to certain ones of the affixed connectors, the other connector of each pair being connected to selected winding leads; and at least one generally U-shaped insulating member straddling end turn portions for supporting the other connector of each pair in a respective location to allow simultaneous interengagement of connector pairs when the annular insulating member is juxtaposed with the U-shaped insulating member.

2. The combination of claim 1 further comprising another annular insulating member having the other of each connector pair affixed thereto.

3. The combination of claim 2 wherein portions of the annular insulating members are adapted to at least partially surround the end turns at one stator end to confine and protect the surrounded end turns.

4. The combination of claim 1 wherein there are more winding leads than external lead wires, the annular member having conductor means thereon for interconnecting selected connector pairs.

5. In a dynamoelectric machine, structure for effecting the interconnection of stator winding leads with external lead wires comprising:
   a plurality of electrical connectors each crimped to a respective stator winding lead;
   a multiple lead wire harness having a common external connector at one end thereof and an individual terminal on each lead wire at the other end thereof; and
   means coupling the electrical connectors to respective lead wires at the ends thereof remote from the external connector including a pair of annular insulating members relatively movable into a juxtaposed position to simultaneously form electrical connections to all of the electrical connectors to electrically couple the electrical connectors to their respective lead wires.

6. In a dynamoelectric machine stator having windings disposed in slots of the stator core and extending therefrom at opposite stator ends to form end turns, a winding connector for attaching external lead wires to the leads of the windings comprising:
   a plurality of pairs of intermeshable electrical connectors, one connector of each pair being connected to selected winding leads and insulatingly supported near winding end turns;

at least one insulating member of generally U-shaped cross section with the U straddling end turn portions for supporting the said one connector of each pair; and a multiple lead wire harness having a common external connector at one end thereof and the other connector of each pair connected to respective lead wires at the ends thereof remote from the external connector for connection to corresponding insulating member supported connectors.

* * * * *